(12) United States Patent
Meinherz et al.

(10) Patent No.: US 9,274,343 B2
(45) Date of Patent: Mar. 1, 2016

(54) LENS CARRIER AND OPTICAL MODULE FOR A LIGHT CURTAIN AND FABRICATION METHOD

(71) Applicant: CEDES SAFETY & AUTOMATION AG, Landquart (CH)

(72) Inventors: Carl Meinherz, Malans (CH); Richard Casty, Chur (CH); Danilo Dorizzi, Chur (CH); Martin Hardegger, Sargans (CH); Manfred Norbert Stein, Domat/Ems (CH); Clau Lombriser, Trun (CH); Guido Baumgartner, Fürstentum Liechtenstein (CH)

(73) Assignee: Rockwell Automation Safety AG (CH)

( * ) Notice: Subject to any disclaimer, the term of this patent is extended or adjusted under 35 U.S.C. 154(b) by 118 days.

(21) Appl. No.: 13/875,846

(22) Filed: May 2, 2013

(65) Prior Publication Data

US 2013/0293966 A1    Nov. 7, 2013

(30) Foreign Application Priority Data

May 2, 2012    (EP) .................................... 12166435

(51) Int. Cl.
  *G02B 27/10*     (2006.01)
  *G02B 27/09*     (2006.01)
  *G01V 8/10*      (2006.01)

(52) U.S. Cl.
  CPC .............. *G02B 27/0961* (2013.01); *G01V 8/10* (2013.01); *Y10T 29/49826* (2015.01)

(58) Field of Classification Search
  CPC . G01V 8/10; G02B 27/0961; Y10T 29/49826
  USPC .................. 359/619–620, 625–626, 628, 821
  See application file for complete search history.

(56) References Cited

U.S. PATENT DOCUMENTS

| | | | |
|---|---|---|---|
| 7,081,644 B2 | 7/2006 | Flaherty et al. | |
| 7,564,180 B2 | 7/2009 | Brandes | |
| 7,821,023 B2 | 10/2010 | Yuan et al. | |
| 8,120,240 B2 | 2/2012 | Brandes | |
| 8,125,137 B2 | 2/2012 | Medendorp, Jr. et al. | |

(Continued)

FOREIGN PATENT DOCUMENTS

| | | |
|---|---|---|
| CN | 101099245 A | 1/2008 |
| CN | 100539215 C | 9/2009 |

(Continued)

OTHER PUBLICATIONS

US 8,076,835, 12/2011, (withdrawn).

(Continued)

*Primary Examiner* — Vipin Patel
(74) *Attorney, Agent, or Firm* — Boyle Fredrickson, S.C.

(57) ABSTRACT

A lens carrier and an optical module for forming a light curtain associated with monitoring a protective field. The lens carrier includes at least one lens for focusing a radiation beam forming said light curtain and a lens mask having at least one opening for shaping the radiation beam to have a predetermined aperture. The lens carrier is formed by overmolding said lens mask with a transparent material. The optical module has such a lens carrier and a module body for mounting a radiation transmitter/receiver carrier that comprises at least one transmitter and/or receiver for transmitting and/or receiving said radiation.

17 Claims, 9 Drawing Sheets

(56) References Cited

U.S. PATENT DOCUMENTS

| | | | |
|---|---|---|---|
| 8,217,412 | B2 | 7/2012 | Yuan et al. |
| 8,410,680 | B2 | 4/2013 | Medendorp, Jr. et al. |
| 8,513,873 | B2 | 8/2013 | Brandes |
| 8,698,171 | B2 | 4/2014 | Yuan et al. |
| 2005/0068769 | A1* | 3/2005 | Schwarz et al. ............ 362/219 |
| 2005/0174767 | A1 | 8/2005 | Flaherty et al. |
| 2006/0065818 | A1* | 3/2006 | Shimokawa et al. ........ 250/221 |
| 2006/0100704 | A1* | 5/2006 | Blake et al. ................ 623/6.37 |
| 2006/0152140 | A1 | 7/2006 | Brandes |
| 2007/0760521 | | 6/2007 | Craford et al. |
| 2007/0223219 | A1 | 9/2007 | Medendorp, Jr. et al. |
| 2008/0102657 | A1* | 5/2008 | Lang ..................... H01R 12/52 439/78 |
| 2009/0050907 | A1 | 2/2009 | Yuan et al. |
| 2009/0050908 | A1 | 2/2009 | Yuan et al. |
| 2009/0108281 | A1 | 4/2009 | Keller et al. |
| 2009/0195137 | A1 | 8/2009 | Brandes |
| 2010/0850213 | | 8/2010 | Craford et al. |
| 2010/0252851 | A1 | 10/2010 | Emerson et al. |
| 2010/0295090 | A1 | 11/2010 | Craford et al. |
| 2011/0012143 | A1 | 1/2011 | Yuan et al. |
| 2011/0050125 | A1 | 3/2011 | Medendorp, Jr. et al. |
| 2011/0057129 | A1* | 3/2011 | Yao et al. .................... 250/552 |
| 2011/0233580 | A1* | 9/2011 | Bierhuizen et al. ........... 257/98 |
| 2012/0032208 | A1 | 2/2012 | Brandes |
| 2012/0187862 | A1 | 7/2012 | Britt et al. |
| 2012/0241781 | A1 | 9/2012 | Yuan et al. |
| 2013/0092960 | A1 | 4/2013 | Wilcox et al. |
| 2013/0249434 | A1 | 9/2013 | Medendorp, Jr. et al. |
| 2013/0256710 | A1 | 10/2013 | Andrews et al. |
| 2013/0270581 | A1 | 10/2013 | Lowes et al. |
| 2013/0341653 | A1 | 12/2013 | Yuan et al. |

FOREIGN PATENT DOCUMENTS

| | | |
|---|---|---|
| CN | 101635294 A | 1/2010 |
| CN | 102132424 A | 7/2011 |
| CN | 202032272 U | 11/2011 |
| CN | 102272923 A | 12/2011 |
| CN | 101635294 B | 5/2012 |
| CN | 102484190 A | 5/2012 |
| CN | 103022024 A | 4/2013 |
| CN | 103189980 A | 7/2013 |
| CN | 103189981 A | 7/2013 |
| DE | 112005000117 T5 | 11/2006 |
| DE | 102008021572 A1 | 12/2008 |
| DE | 112011103147 T5 | 7/2013 |
| DE | 112011103148 T5 | 7/2013 |
| EP | 1842218 A2 | 10/2007 |
| EP | 1982866 A2 | 10/2008 |
| EP | 2056363 A2 | 5/2009 |
| EP | 1842218 A4 | 10/2010 |
| EP | 2291860 A1 | 3/2011 |
| EP | 2304817 A2 | 4/2011 |
| EP | 1982866 B1 | 6/2011 |
| EP | 2425466 A1 | 3/2012 |
| FR | 2913748 A1 | 9/2008 |
| IN | 08640DN2011 A | 1/2013 |
| JP | 2008527708 T2 | 7/2008 |
| JP | 2008300350 A2 | 12/2008 |
| JP | 2009111395 A2 | 5/2009 |
| JP | 2009147391 A2 | 7/2009 |
| JP | 2011035420 A2 | 2/2011 |
| JP | 2011035421 A2 | 2/2011 |
| JP | 2011521469 T2 | 7/2011 |
| JP | 4744534 B2 | 8/2011 |
| JP | 2011151406 A2 | 8/2011 |
| JP | 2011523210 T2 | 8/2011 |
| JP | 2012084900 A2 | 4/2012 |
| JP | 5091000 B2 | 12/2012 |
| JP | 2013093604 A2 | 5/2013 |
| JP | 5236803 B2 | 7/2013 |
| JP | 2013179302 A2 | 9/2013 |
| JP | 5379819 B2 | 12/2013 |
| KR | 100743007 | 7/2007 |
| KR | 20110016949 A | 2/2011 |
| KR | 20110031946 A | 3/2011 |
| KR | 20110137836 A | 12/2011 |
| KR | 20130079541 A | 7/2013 |
| RU | 2011146934 A | 6/2013 |
| TW | 200625698 A | 7/2006 |
| TW | 200947772 A | 11/2009 |
| TW | 200950160 A | 12/2009 |
| TW | 200952153 A | 12/2009 |
| TW | 1320236 B | 2/2010 |
| TW | 201042785 A | 12/2010 |
| WO | 2006076066 A2 | 7/2006 |
| WO | 2006076066 A3 | 6/2007 |
| WO | 2009142675 A2 | 11/2009 |
| WO | 2009148483 A1 | 12/2009 |
| WO | 2009142675 A3 | 1/2010 |
| WO | 2010126592 A1 | 11/2010 |
| WO | 2009148483 A8 | 12/2010 |

OTHER PUBLICATIONS

European Extended Search Report; Application No. 12166435.3; Dated Aug. 8, 2012—(7) pages.

* cited by examiner

LENS CARRIER AND OPTICAL MODULE FOR A LIGHT CURTAIN AND FABRICATION METHOD

CROSS REFERENCE TO RELATED APPLICATIONS

This application claims priority to European Patent Application No. EP12166435.3 filed on May 2, 2012 and titled "Lens Carrier And Optical Module For A Light Curtain And Fabrication Method" and the disclosure of which is incorporated herein.

BACKGROUND

The present invention relates to industrial light curtains which monitor a protective or surveillance field and in particular relates to optical modules that can be used for such a light curtain.

Light curtains which are formed by one or more radiation beams are usually also referred to as light grids or light barriers.

Generally, light curtains detect the movement or intrusion of objects into guarded zones and may provide protection for human operators who are working with machines or other industrial equipment. Some light curtain systems are designed to control and monitor industrial automation processes and are in particular used for verifying assembly processes, counting objects, confirming an ejection process, recognize leading edges of transported goods, recognizing irregular shapes and a lot of other applications, etc.

Safety light curtains employing infrared or visible light beams are used to provide operator safety in a variety of industrial applications. In particular, the operator protection around machinery, such as punch presses, guillotines, molding machines, automatic assembly equipment, coil winding machinery, robot operation, casting operations and the like can be improved by using such light curtains. Conventional light curtains typically employ light emitting diodes (LED) mounting at spaced positions along a transmitter bar at one side of the guarded zone, and phototransistors (PT), photodiodes or photo receivers mounted along a receiver bar at the opposite side of the zone. The LEDs transmit modulated infrared light beams along separate parallel channels to the PTs at the receiver bar. If one or more beams are blocked from penetration by an opaque object, such as the operator's arm, the control circuit shuts down the machine, prevents the machine from cycling, or otherwise safeguards the area.

As mentioned above, such an interruption of the beam can also be used for counting objects or verifying the entrance of goods through defined areas.

Usually, light curtains comprise two optical units, often called bars, sticks or strips, which are formed as to different constructional units, one of the optical units having the function of an emitter and one of a receiver. This dedicated architecture of an emitter and receiver, however, has several drawbacks, for instance the fact that the fabrication costs are high, because each type of optical unit has to be fabricated differently. Consequently, there exist concepts that use an architecture, wherein each optical unit has light emitting elements and light receiving elements at the same time. By providing the optical units with identical optical modules, which can operate as a receiver as well as a transmitter, and by additionally providing plug-in units, which differentiate the particular optical unit in its function as the emitter with, for instance, a test input, or as the receiver with, for instance, the output signal switching devices (OSSD), a particularly cost-effective way of fabricating optical units for a large scale production can be achieved.

Such a modular architecture is for instance proposed in the European patent application EP 11 162 263.5.

Known optical modules, however, often suffer from the problem that the alignment of the optical axis for each of the radiation beams is difficult and that the fabrication of the whole module is expensive and involves a lot of rejections due to defects.

The problem underlying the present invention therefore is to provide an optical module and a fabrication method, whereby a particular cost-effective and reliable fabrication and adjustment of the optical components can be achieved.

SUMMARY OF THE INVENTION

The present invention provides an improved lens carrier in an optical module for use in a light curtain. The lens carrier has at least one lens for focusing a radiation beam forming the light curtain and a lens mask having at least one opening for shaping the radiation beam to have a predetermined aperture.

According to the present invention this lens carrier is formed by overmolding the lens mask with a transparent material. Thus, the lens carrier and at least one lens are fabricated as one integral part. In the case where a plurality of lenses is formed on the lens carrier, by means of such a simultaneous overmolding step, all the lenses can be fabricated and aligned with respect to each other in one tightly toleranced overmolding step.

Due to the fact that not a plurality of lenses with smaller geometrical dimensions has to be aligned individually, but a much larger array of lenses can be aligned simultaneously, the accuracy and ease of the alignment is significantly improved.

By forming the lenses and the lens mask as one combined part, no separate alignment step has to be performed during assembly with respect to the position of the lens mask relative to the lenses. Thus, a very high precision can be reached for the lens mask placement and the assembly of a complete light curtain can be performed with much better resolution.

In particular, when fabricating the lens mask from a stamped metal sheet, improved thermal expansion characteristics of the lens carrier can be achieved. It could be shown that the thermal expansion of the composite lens carrier including a metal lens mask overmolded with a plastic lens material is determined by the characteristic values of the metal sheet. These values, however, are compatible with the printed circuit board on the one hand and surrounding metal profiles on the other hand. Thus, the robustness and reliability of the assembled optical module can be improved even for applications in a rough environment with considerable temperature differences.

There are several highly advanced techniques for fabricating lenses by molding techniques and a variety of different lens forms can be realized on the lens carrier according to the present invention. In particular, plano-convex or biconvex lenses can be formed on the lens carrier. However, also a Fresnel lens can be fabricated which has the advantage of being much thinner than the plano-convex or biconvex lenses.

According to a further advantageous embodiment, the lens carrier according to the present invention can also be provided with additional optical or mechanical functional elements. These optical functional elements can for instance be waveguides for optical indicator means, parts of laser alignment systems or the like. The mechanical functional elements may for instance comprise mounting means, additional mechanical features, which allow a disassembly of the fully mounted optical module from its housing or the like.

In any case, the tolerance chain can be kept short and therefore any additional optical or mechanical features are directly correlated with the position of the lenses and the lens mask.

According to an advantageous embodiment, the transparent material which forms the lenses comprises polymethylmethacrylate (PMMA) or polycarbonate (PC). It is appreciated that all other transparent materials which have the required chemical and physical characteristics may of course also be used for fabricating a lens carrier according to the present invention. An overview over suitable materials can for instance be found in De Schipper, R. et al: "Kunststoffoptik", Optik & Photonik, October 2006, Nr. 2, p. 47-49.

An optical module according to the present invention comprises an integrally formed lens carrier and a module body for mounting a radiation transmitter/receiver carrier comprising at least one transmitter and/or receiver for transmitting and/or receiving the radiation. In most cases the carrier will be formed by a printed circuit board (PCB). In particular, the module body and the lens carrier can be fabricated as one integral molded part. Thus, very low tolerances between the at least one lens and the module body can be achieved. This is particularly advantageous because the module body in most cases will represent the geometric reference for aligning the optical module during assembly. Thus, the tolerances between the optical axis of the lens and any surfaces to which the optical module is mounted, can be kept low.

Furthermore, the module body may comprise a stabilization element which is integrated into the module body. Thus, the mechanical stability can be enhanced and furthermore, the thermal expansion can be adapted to the characteristics of the lens carrier. If a PCB is mounted to the module body, same has a very similar thermal expansion as the module, which is particularly important when LED chips are placed on the printed circuit board by means of a chip-on-board (COB) assembly technique. However, any other circuit carriers, e. g. Molded Interconnect Device (MID) carriers, can also be used. Such an MID carrier can firstly be fabricated together with the module body in the same molding step, and secondly provides the possibility of fabricating a three-dimensional circuit carrier structure. Moreover, the module body itself could be an MID part where the electrically conductive leads and optoelectronic components are arranged directly on the module body. In this case, an additional circuit carrier for the optoelectronic components can be avoided.

The stabilization element may furthermore form or be a part of an optical stop element comprising at least one cut-out for letting pass the radiation from/to the radiation transmitter and/or receiver. To this end, the stabilization element is preferably fabricated from an opaque material, for instance from a stamped metal sheet. In this particular case, when fabricating the stabilization element as well as the lens mask from an electrically conductive material, these sheets additionally provide an electromagnetic shielding for the underlying electronic components on the PCB. For mounting the printed circuit board on the module body, same can advantageously be provided with mechanical fixing means, such as protrusions, snap-in hooks, snap-in notches, or the like. The dimensions of the cut-outs may also be defined by the overmolded plastic material in order to form a particularly tightly toleranced aperture.

In order to avoid that neighboring radiation paths are disturbed, the optical module according to the present invention has an optical shielding element (also called beam separator in the following), which can be inserted as a part separate from the module body and the lens carrier. As this part does not need any particularly accurate alignment, it can be fabricated as a cheap and simple part, which is preferably formed from an opaque material.

A method for fabricating an optical module according to the present invention includes fabricating a lens carrier by overmolding a lens mask with a transparent material and providing a module body, which is fabricated by overmolding the lens carrier. Thus, both parts can be fabricated within the same tool so that a particularly accurate alignment and low tolerances can be achieved.

According to an advantageous embodiment, first the lens mask is inserted into the tool which is then overmolded to form the lens carrier. Without removing the lens carrier from the molding tool in a next step the stabilization element may be positioned within the molding tool and the lens carrier and the stabilization element are then overmolded to form the integrated optical module. This is a particularly fast, time-saving and at the same time accurate fabrication method for an optical module according to the present invention. On the other hand, when the module body and the lens carrier are formed separately, the beam separator can be integrated into the module body or can be mounted in a direction along the optical axis of the radiation beam.

Of course, the module body and the lens carrier can also be fabricated in separate molding steps and subsequently be attached to each other.

According to the present invention, the optical shielding element is preferably inserted after removing the module body with the lens carrier from the molding tool by sliding in the optical shielding element in a direction across to the optical axis of the at least one lens.

BRIEF DESCRIPTION OF THE DRAWINGS

The accompanying drawings are incorporated into and form a part of the specification to illustrate several embodiments of the present invention. These drawings together with the description serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. Further features and advantages will become apparent from the following more particular description of the various embodiments of the invention, as illustrated in the accompanying drawings, in which like references refer to like elements, and wherein.

DETAILED DESCRIPTION OF THE PREFERRED EMBODIMENTS

Figure 1:
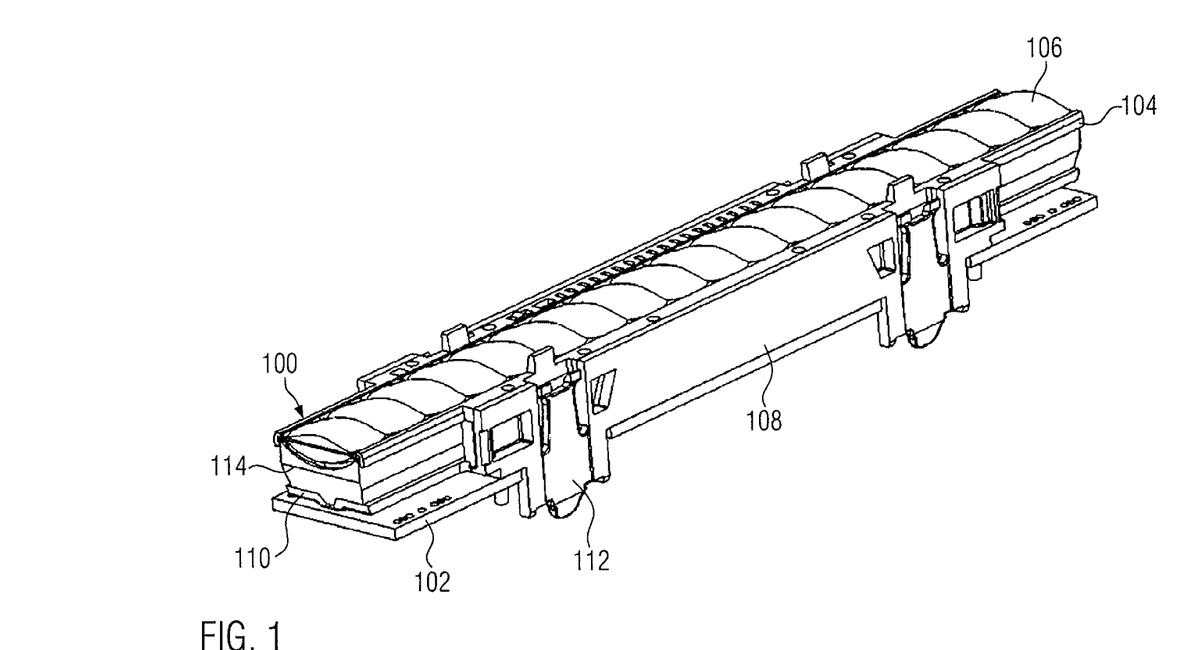
FIG. 1 shows a perspective view of an optical unit with a printed circuit board mounted thereto.

The present invention will now be explained in more detail with reference to the figures. In particular, FIG. 1 shows in a perspective view an optical module 100 according to the present invention with a printed circuit board (PCB) 102 connected thereto. The optical module with the PCB 102 are to be mounted in an outer housing, a so-called profile (not shown in the figures).

As shown in FIG. 1, the combination of the optical unit 100 and the PCB 102 represents the functional unit for transmitting and/or receiving light which forms a light curtain for monitoring a desired surveillance area. A second, corresponding optical module with a printed circuit board is arranged opposing to the one shown in FIG. 1. Alternatively, also reflecting elements can of course be used.

The PCB 102 carries the light-emitting and/or receiving elements and the required interconnection leads. If necessary, also integrated circuitry can be provided on one or both of the surfaces of the printed circuit board 102. The emitted radiation can in particular be visible light, in particular red light with a wavelength range of 620 nm to 750 nm. By using visible light, optical units containing optical modules according to the present invention can be aligned when mounting same in the surveillance area by visual control of a human operator. In contrast to light curtains where infrared light is used for the emitters, such an alignment can be performed without additional costs and furthermore, the eye protection requirements can be fulfilled much more easily. At the geometric position of each radiation beam the PCB 102 may carry an LED as a light emitting device or a photodiode as a light detecting element or may even carry combined transceiver element, as this is for instance proposed in the European patent application EP 11 162 263.5 "Modular light curtain and optical unit for a light curtain".

According to the present invention, the optical module comprises a lens carrier 104, which combines a plurality of lenses 106 as one integral unit. A module body 108 serves for mounting the PCB 102 and furthermore carries a stop element having openings for letting pass the radiation between the PCB 102 and the lens 106. This will become more apparent when further looking at FIG. 2. Mounting and alignment means 112 are provided for adjusting the position of the optical module with the PCB 102 in a profile (not shown in the figures).

As all the lenses 106 of the optical module 100 are fabricated as one single part, there is no requirement of aligning same individually when assembling the optical module 100. Consequently, a very high accuracy regarding the distance and the parallelism of the radiation beams can be achieved. As this is generally known for light curtains, different resolution standards are defined according to the particular application field to be monitored. A light curtain normally has several beams that are placed closely together, whereas a light grid consists of only one, two, three or four light beams. The beams are closest on a light curtain that is used for finger detection, then the resolution is commonly 14 mm. Light curtain beams are commonly at their widest spacing when used for thigh detection (such as at 90 mm resolution). Accordingly, hand resolution is commonly defined at approximately 30 mm resolution.

For separating the individual beams from each other and for avoiding interference of scattered light, the optical module 100 further comprises a beam separating element 114. The beam separating element 114 is preferably fabricated from an opaque plastic material and separates the space between the lens 106 and the LED or photodiode on the PCB 102 into individual chambers.

Figure 2:
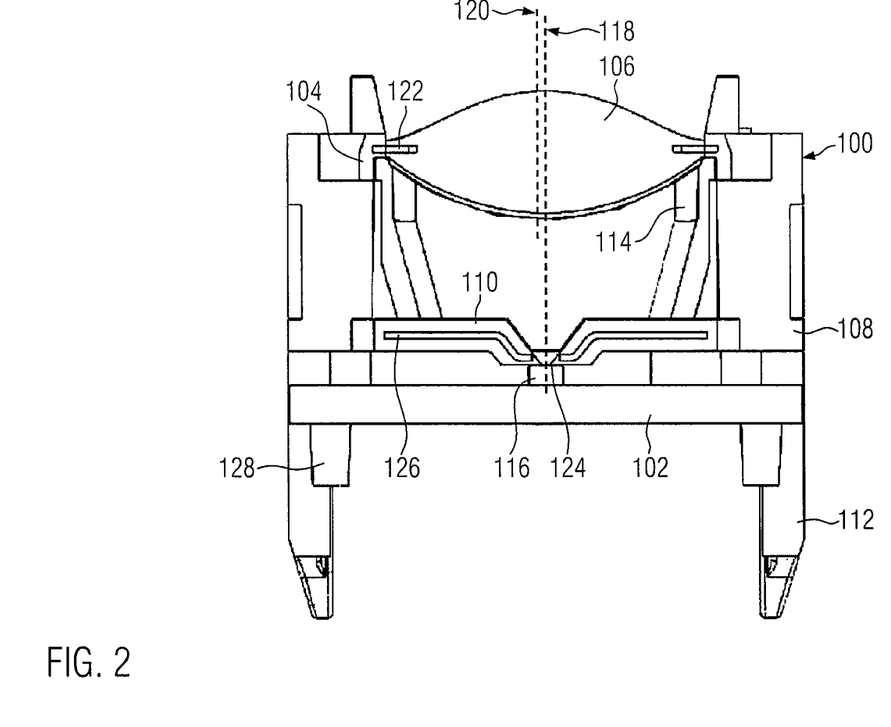
FIG. 2 shows a schematic sectional view of the arrangement of FIG. 1.

FIG. 2 shows a schematic sectional view of the arrangement of FIG. 1. On the PCB 102 a light receiving and/or a light emitting element 116 is mounted. This optical sender and/or receiver 116 defines a first optical axis 118. On the other hand, the centre of the lens 106 defines a second optical axis 120. These two optical axes preferably coincide, but in any case are preferably as close as possible to each other. According to the present invention, the lens carrier 104 is formed by overmolding a lens mask 122 with a transparent plastic material. The transparent material may for instance comprise polymethylmethacrylate (PMMA) or polycarbonate (PC). The lens mask 122 has openings corresponding to the location of each lens 106, which are formed to shape the radiation emitted by a light-emitting element 116 into a particular beam shape corresponding to the required resolution of the light curtain.

Moreover, for shaping the transmitted light at the direct source, an optical stop element 110 with a small opening 124 is provided. This optical stop element can also be an integral part of the module body 108. A preferably metallic stabilization element 126 is integrated within the optical stop element 124. The beam separating element 114 defines different chambers under each lens 106 for optically shielding the individual beams from each other.

Figure 3:
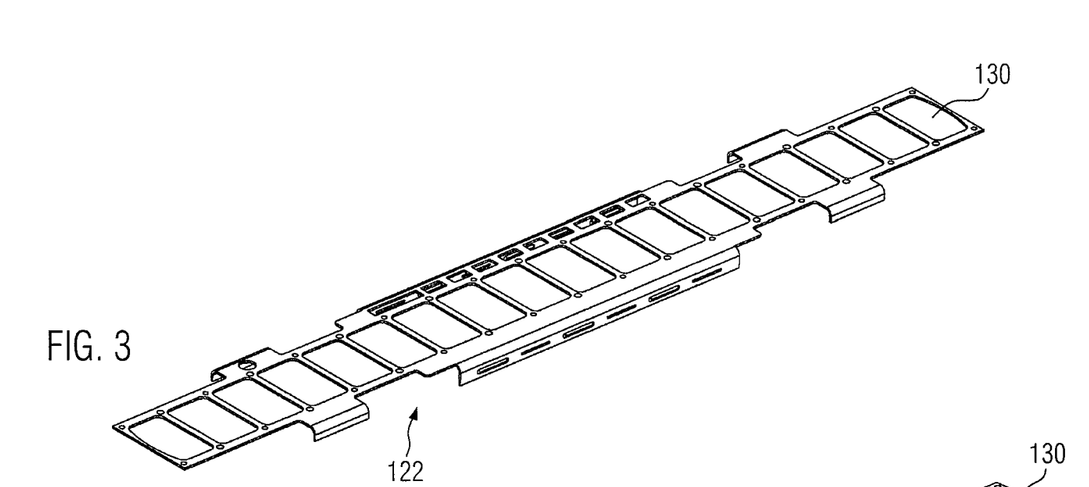
FIG. 3 shows a lens mask according to a first embodiment.
Figure 4:
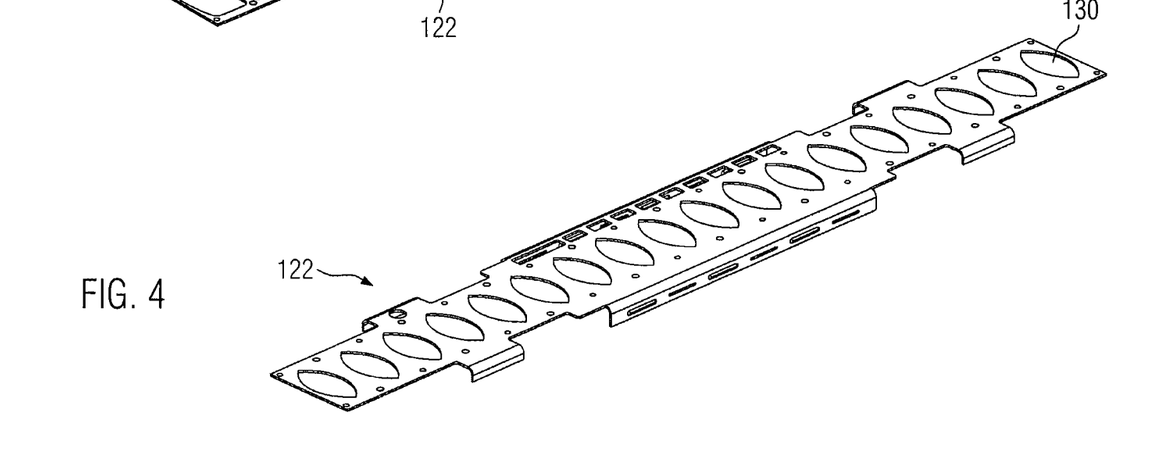
FIG. 4 shows a lens mask according to a second embodiment.
Figure 5:
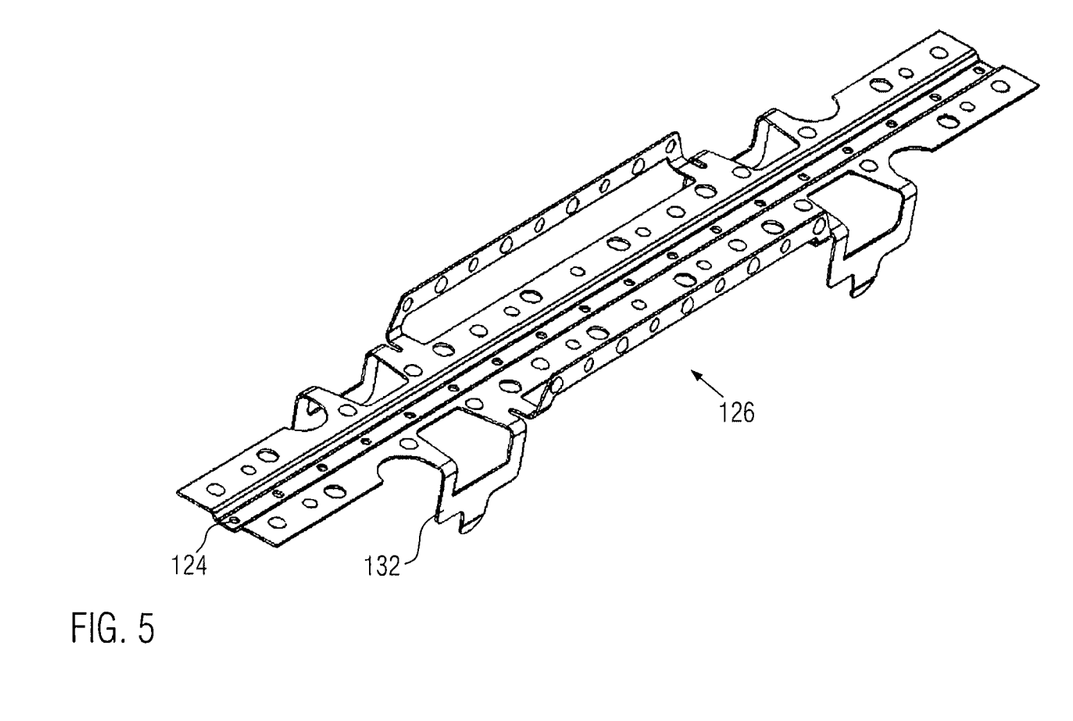
FIG. 5 shows a stabilization element.

For fabricating the optical module 100 according to the present invention, the lens mask 122, which is shown in more detail in FIGS. 3 and 4, is fabricated from a stamped and bent metal sheet. The lens mask is aligned in a molding tool and overmolded with a transparent plastic material to form the lens carrier 104 with a plurality of lenses 106. According to the present invention, the lens carrier is preferably not removed from the molding tool, but in a next step, the stabilization element 126, which will be explained in more detail referring to FIG. 5, is aligned in the molding tool. In a subsequent second molding step the module body 108 is fabricated. The used material may for instance be Polybutyleneterephthalate (PBT).

By fabricating the module body as one integral molded part with the lens carrier very tight tolerances can be achieved, because the elements which define the later mounted position of the PCB 102 are fabricated within the same tool as the lens 106. According to the embodiment shown in FIG. 2, a plurality of mounting projections 128 interact with corresponding openings in the PCB 102 for mounting same at the module body 108.

However, the module body 108 can also be formed as a separate component which is joined with the lens carrier 104 by any known mechanical means.

A further advantageous feature of the present invention is the fact that by integrating metal structures as the lens mask 122 and the stabilization element 126, the thermal expansion of the lens carrier 104 and the optical stop element 124 are much closer to the thermal expansion of the PCB 102 than a pure plastic material would be. Consequently, even under significantly differing temperature conditions, the alignment between the position of the light receiving and/or emitting elements 116, the openings of the optical stop element and the optical axes of the lenses 106 can be achieved.

A further advantage of using an electrically conductive lens mask and, in particular, stabilization element 126 is the additional effect of an electromagnetic shielding towards the PCB 102.

FIGS. 3 and 4 show two particular embodiments of the lens mask 122 before same is overmolded with the transparent lens material. In particular, FIG. 3 shows a form of the masking opening 130, which can be used for optical modules that allow the application in an environment where a hand resolution is required. In particular, the light passing through two or more openings 130 is combined to form one radiation beam and a larger distance is left between one beam and the next. FIG. 4, on the other hand, shows a lens mask 122 that is suitable for shaping closely adjacent radiation beams for a finger resolution. To this end, the openings in the lens mask 130 have the shape of two circular arcs forming an eye shaped, biconvex outline.

According to one advantageous embodiment, the lens mask 122 further comprises additional openings and protrusions which can serve purposes as mounting an alignment laser or indication LEDs or the like. The lens mask 122 is fabricated by stamping and bending a metal sheet.

According to a preferred embodiment of the present invention, the optical stop element 110, which is formed integrally with the module body 108, also contains an integrated metal part, the stabilization element 126 shown in FIG. 5. The stabilization element 126 is preferably fabricated in a similar process as the lens mask 122 by stamping and bending a metal sheet. In particular, for defining small apertures of the optical stop element, cut-outs 124 are provided, which in the finally mounted state correspond to the positions where the light receiving and/or emitting elements are located on the printed circuit board 102. In addition to providing mechanical stabilization in the plane of the optical stop element 110 of FIGS. 1 and 2, the stabilization element 126 has reinforcement elements 132 that extend along a sidewall of the module body for adding mechanical stability thereto. In particular, the mounting and alignment means 112 can be reinforced by such a reinforcement element 132. Due to its electrical conductivity, the stabilization element 126 also provides electromagnetic shielding for the adjacent PCB components.

Figure 6:
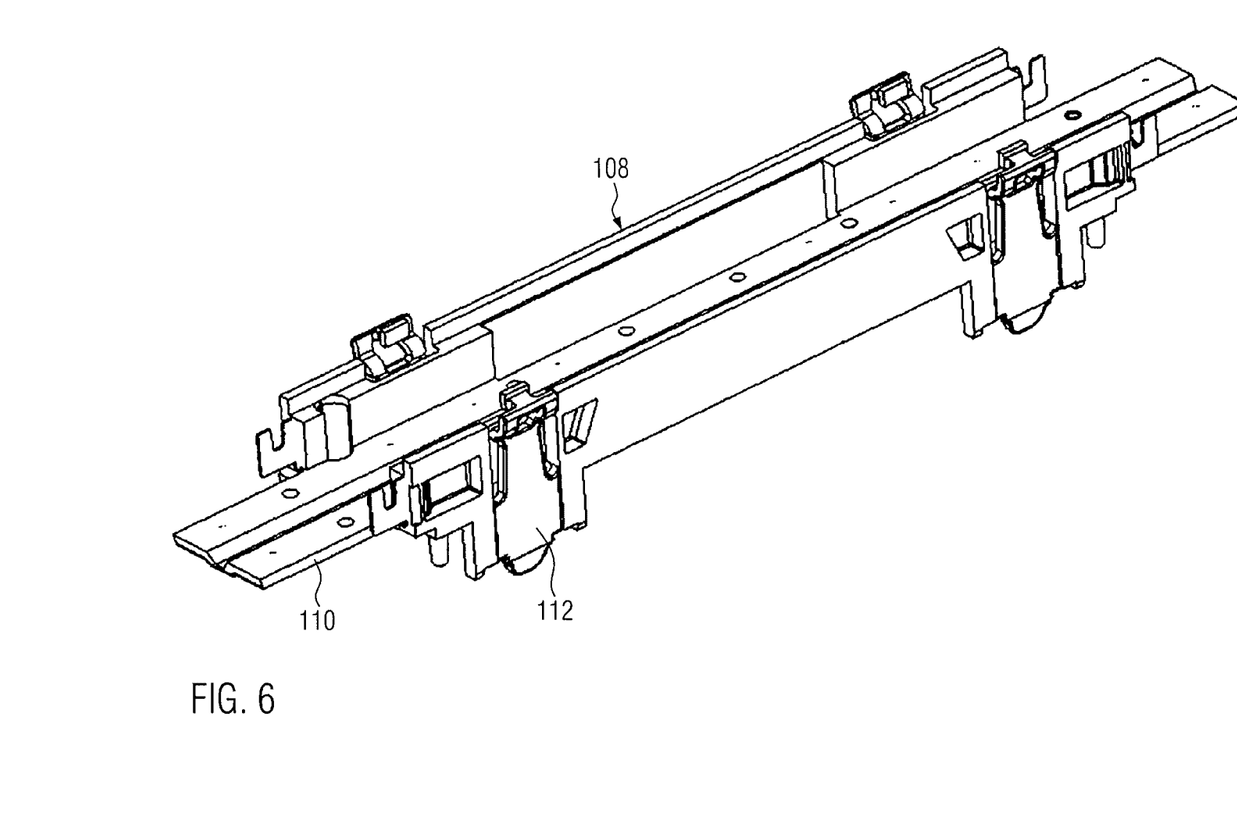
FIG. 6 shows a schematic representation of the stabilization element and the belonging module body.

FIG. 6 shows how the plastic material forming the module body 108 is cast around the stabilization element 126. In this figure, the lens carrier which may be overmolded together with the stabilization element 126 in the same fabrication step is not shown.

Figure 7:
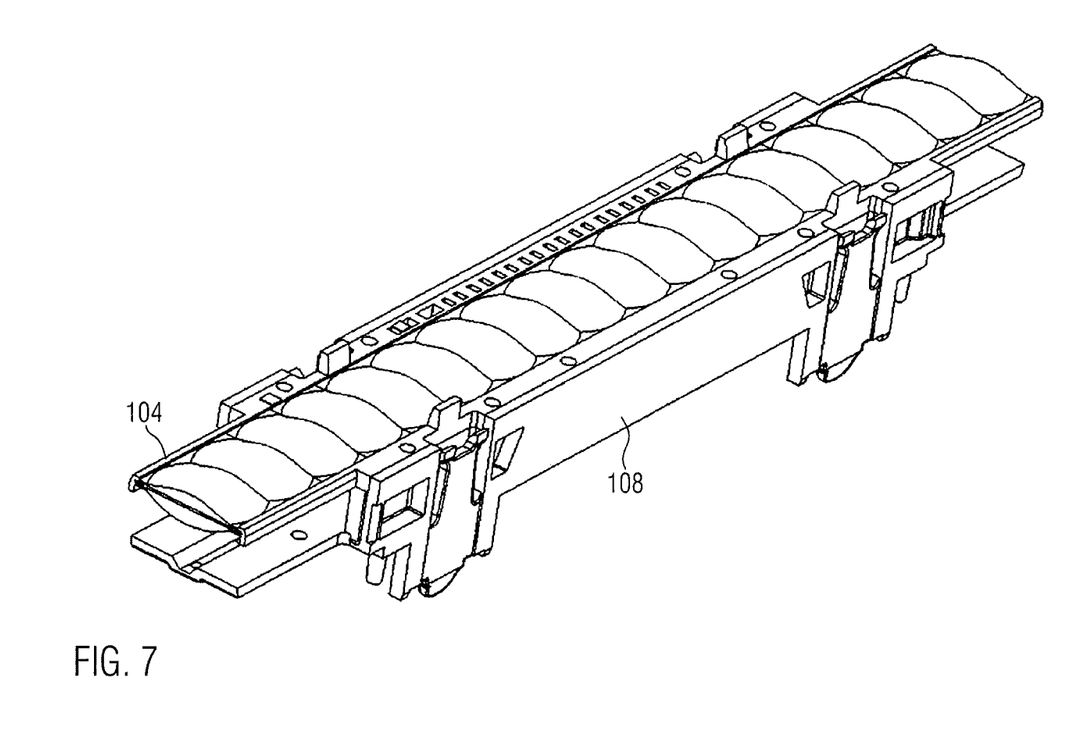
FIG. 7 shows a perspective view of the lens carrier and the module body after removal from the molding tool.
Figure 8:
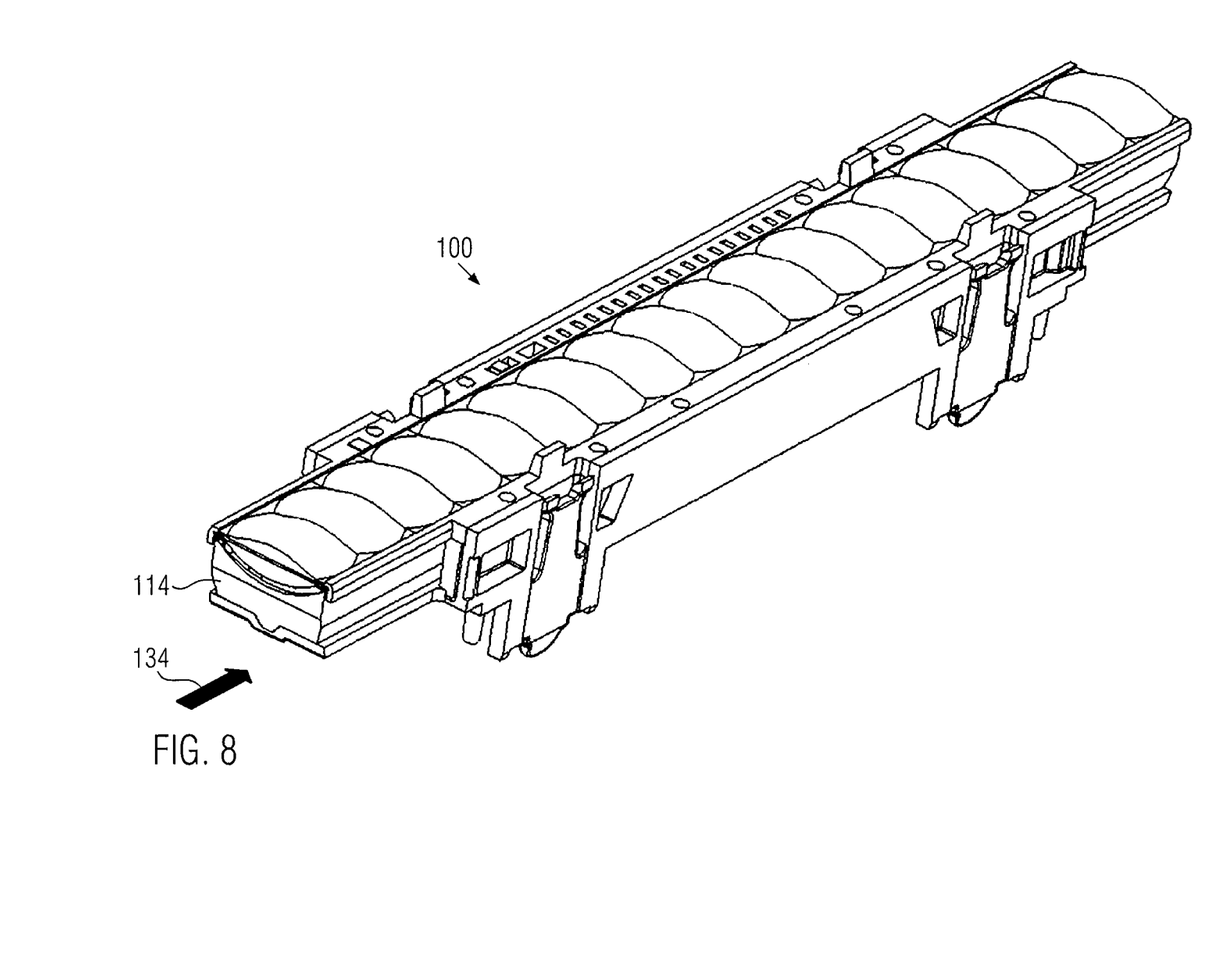
FIG. 8 shows a perspective view of the optical module after insertion of the optical shielding element.

FIG. 7 shows the complete part after overmolding the lens carrier 104 and stabilization element 126 to form the module body 108. This is the state of the part where it is removed from the molding tool. In a final step, the beam separating element 114 is inserted in a direction 134 across to the optical axis of the lenses 106 (see FIG. 8).

Figure 9:
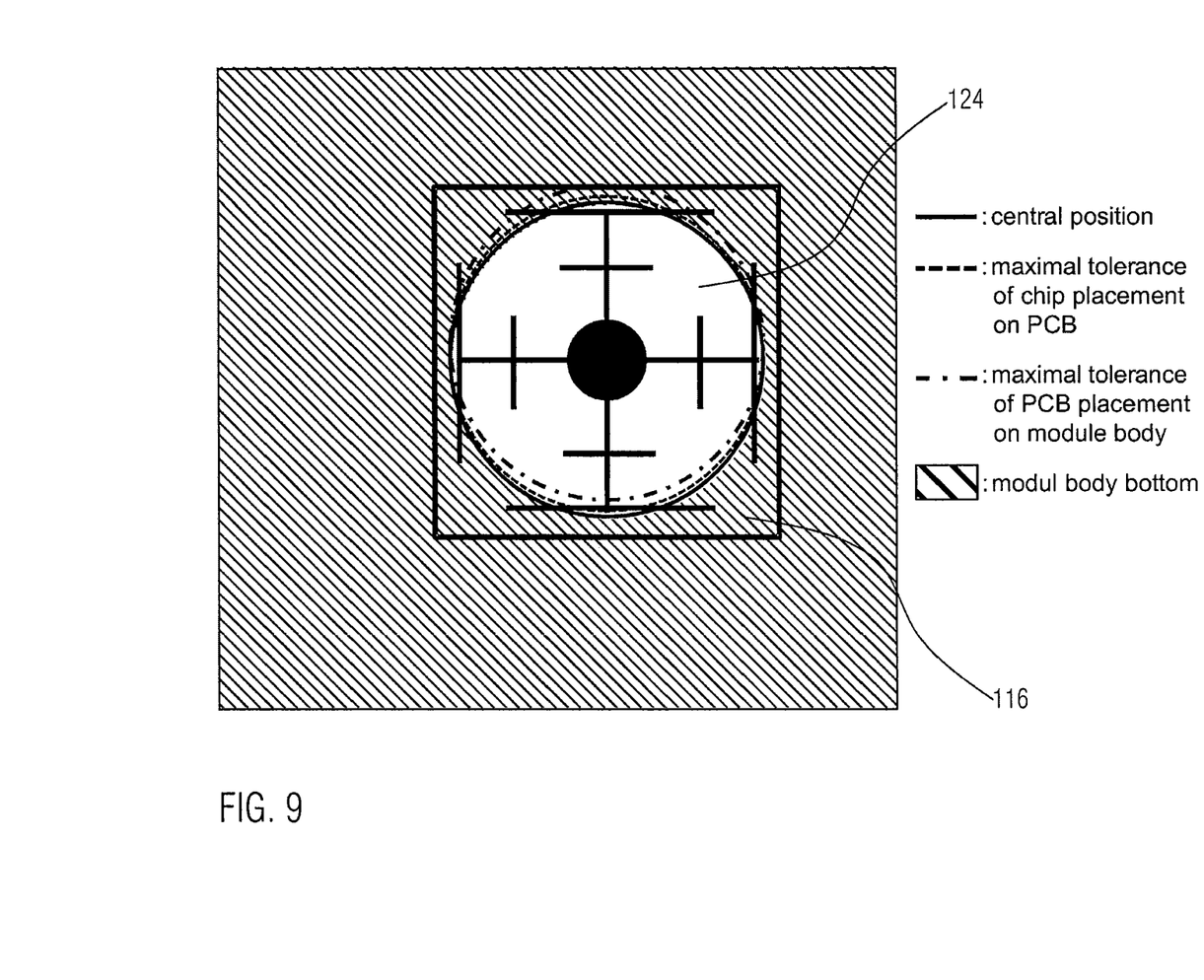
FIG. 9 shows a schematic representation of the various tolerances for an LED position.

By fabricating the optical module 100 according to the fabrication steps explained above, very tight tolerances can be reached for the position of the LED or photodiode with respect to the optical axis of the lens. FIG. 9 compares the tolerances of the chip placement on the PCB 102 and the tolerance of the PCB placement with respect to the module body 100. With a desired central position with regard to the openings 124 it can be shown that in any case the LED 116 is sufficiently centered with respect to the opening 124. Chip LEDs as well as surface mount technology (SMT) LEDs can be used in an optical module according to the present invention.

Figure 10:
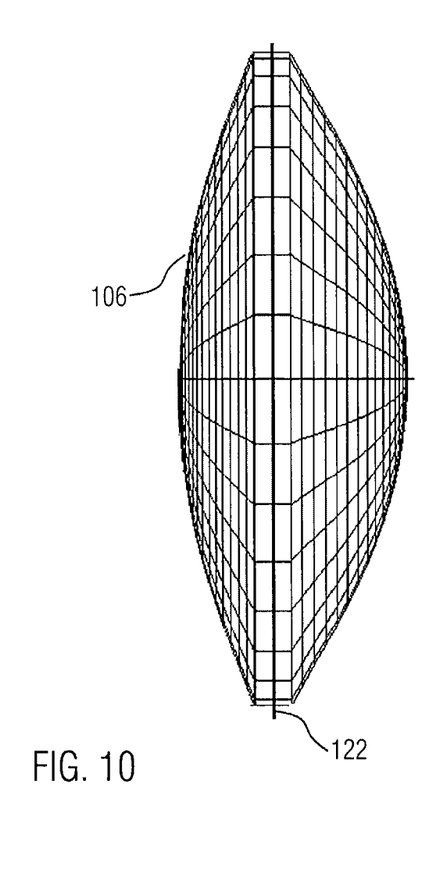
FIG. 10 a schematic cross-section through a biconvex lens.
Figure 11:
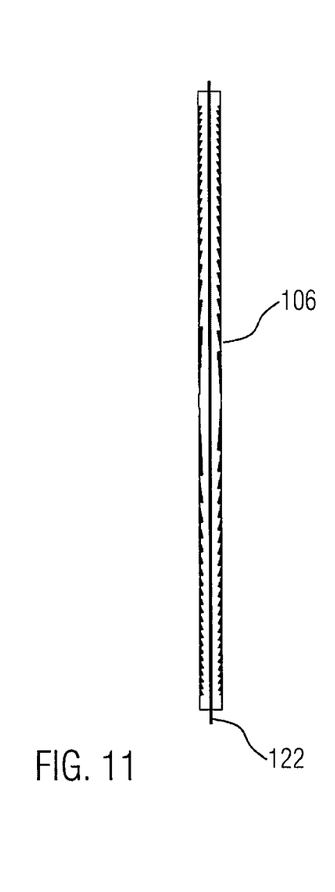
FIG. 11 shows a schematic sectional view of a Fresnel lens according to the present invention.

Although the overmolded lenses 106 are always shown as being formed by biconvex lenses in the previous figures and as shown in FIG. 10, it is not necessarily required to form biconvex lenses. FIG. 11 shows the alternative structure of a Fresnel lens cast around the lens mask 122. As can be seen from the direct comparison with FIG. 10, the advantage of using a Fresnel profile for forming the lens 106 is the uniform and significantly reduced thickness of the Fresnel lens. In particular for the molding step, a more uniform thickness is advantageous. On the other hand, much smaller sizes of the optical module 100 can be reached with flat lenses which may be advantageous in tight installation spaces. Furthermore, also plano-convex lenses can be formed.

In summary, the present invention provides an improved optical module for a light curtain by combining or alternatively using the following improvements:

The lenses are fabricated with an integrated lens mask by placing a metal sheet which serves as the lens mask into the molding tool in a first step and by overmolding this metal sheet with the lens material, e.g. PC or PMMA. Hence, one single part is produced instead of a lens and a separate lens mask, thus facilitating the mounting process. A very high precision can be reached for the lens mask placement. When using such an assembly for safety light curtains, a very exact resolution can be achieve because the lens mask has extremely low tolerances in respect to the lens. Furthermore, the thermal expansion is defined by the metal sheet instead of the plastic characteristics and therefore is much less critical than for pure plastics. Moreover, Fresnel lenses can be used instead of standard biconvex or plano-convex lenses.

A module body according to the present invention is also preferably reinforced with an integrated metal sheet. Firstly, the metal sheet is stamped to the required shape and secondly, the metal sheet is bent as required and placed into a molding tool. In a third step the metal sheet is overmolded with the module body material, e.g. PBT. In an advantageous way, the mechanical stability and robustness of the module body is enhanced by the metal sheet. Preferably, no glass fibers are needed in the plastic for improvement of stability, which could impair the mechanic tolerances. Furthermore, avoiding glass fibers in the plastic material also extends the lifetime of the molding tool. The thermal expansion coefficient of a module body having an integrated metal sheet is very similar to the coefficient of a PCB, resulting in a very accurate positioning of the optical components with respect to the module body.

Finally, the module body and the lens carrier can be fabricated as one integrated molded part. In a first step the lens with the lens mask are fabricated by a molding step. In a second step, in the same tool and without extracting the lens carrier, the module body is molded so that one single part is formed including the lens and the module body.

Hence, very low tolerances between the lenses and the module body can be achieved. The integrated metal sheets of the lens mask and the stabilization element equalize the thermal expansion of the two parts and approximate same to the thermal expansion coefficient of a PCB. This is particularly important when LED chips, which are not much bigger than the aperture in front of the LED, are placed on the PCB by means of a chip-on-board assembly technique.

Finally, it should be mentioned that the use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What we claim is:

1. An optical module for a light curtain associated with monitoring a protective field, said optical module comprising:
    a lens carrier having:
        at least one lens for focusing a radiation beam associated with the light curtain;
        a lens mask having at least one opening for shaping the radiation beam to have a predetermined aperture; and
        wherein said lens carrier is formed by overmolding said lens mask with a transparent material; and
    a module body for mounting said lens carrier and a radiation transmitter/receiver carrier that comprises at least one transmitter and/or receiver for transmitting and/or receiving said radiation and positionally associated with the lens carrier; and
    wherein said module body comprises a stabilization element that is integrated into the module body for enhancing mechanical stability of the module body and wherein said lens mask and said stabilization element are fabricated from an electrically conductive material for forming an electromagnetic shielding.

2. The optical module according to claim 1, wherein said lens mask is fabricated from a stamped metal sheet.

3. The optical module according to claim 1, wherein said at least one lens is a biconvex lens, a plano-convex lens, or a Fresnel lens.

4. The optical module according to claim 1, further comprising at least one of an optical functional element and a mechanical functional element.

5. The optical module according to claim 1, wherein said transparent material is further defined as at least one of a polymethylmethacrylate (PMMA) material and a polycarbonate (PC) material.

6. The optical module according to claim 1, wherein said module body and said lens carrier are fabricated as one integral molded part.

7. The optical module according to claim 1, further comprising an optical stop element having at least one opening for letting radiation from/to said at least one radiation transmitter and/or receiver pass therethrough.

8. The optical module according to claim 1, further comprising a mechanical fixing means for attaching said radiation transmitter/receiver carrier.

9. The optical module according to claim 1, further comprising an optical shielding element for optically shielding a propagation path associated with the radiation beam between said module body and said lens carrier.

10. The optical module according to claim 9, wherein said optical shielding element is fabricated as a part separate from the module body and the lens carrier.

11. A method for fabricating an optical module, said method comprising:
    fabricating a lens carrier that comprises at least one lens for focusing a radiation beam, and a lens mask having at least one opening for shaping a radiation beam to have a predetermined aperture, by overmolding the lens mask with a transparent material;
    fabricating a module body for mounting the lens carrier and a radiation transmitter/receiver carrier comprising at least one transmitter and/or receiver for transmitting and/or receiving radiation associated with the radiation beam;
    wherein said module body is fabricated by overmolding said lens carrier or said lens carrier is fabricated by overmolding said module body;
    fabricating the lens mask and a stabilization element from an electrically conductive material for forming an electromagnetic shielding; and
    integrating the stabilization element into the module body to enhance mechanical stability of the module body.

12. The method according to claim 11, wherein fabricating the module body further comprises:
    inserting the stabilization element into a molding tool after the lens carrier has been fabricated and without removing the lens carrier from said molding tool; and
    overmolding said lens carrier and said stabilization element for forming said optical module.

13. The method according to claim 12, wherein said stabilization element is formed by stamping and bending a metal sheet.

14. The method according to claim 11, wherein fabricating the lens carrier further comprises:
    producing the at least one lens mask by stamping and bending a metal sheet, said at least one lens mask having at least one opening for shaping the radiation beam to have a predetermined aperture; and
    overmolding said at least one lens mask, thereby forming the at least one lens to be aligned with the at least one opening.

15. The method according to claim 11, further comprising fabricating the module body from a polybutyleneterephthalate (PBT) material.

16. The method according to claim 11, further comprising:
    fabricating an optical shielding element from an opaque material; and
    inserting the optical shielding element between the lens carrier and the module body such that the optical shielding element is aligned for optically shielding a propagation path of the radiation between said module body and said lens carrier.

17. An optical module for a light curtain associated with monitoring a protective field, said optical module comprising:
    a lens carrier having at least one lens for focusing a radiation beam associated with the light curtain and a lens mask that is overmolded with a transparent material for shaping the radiation beam;

a module body for mounting a radiation transmitter/receiver carrier that comprises at least one transmitter and/or receiver for transmitting and/or receiving said radiation and positionally associated with the lens carrier;

wherein said module body comprises a stabilization element that is integrated into the module body for enhancing mechanical stability of the module body; and wherein said lens mask and said stabilization element are fabricated from an electrically conductive material for forming an electromagnetic shielding.

* * * * *